US008169862B1

(12) United States Patent
Ho

(10) Patent No.: US 8,169,862 B1
(45) Date of Patent: May 1, 2012

(54) TURNTABLE HAVING MULTIPLE-POINT TOUCH FUNCTION FOR A DIGITAL SOUND-SIGNAL DEVICE

(76) Inventor: Chin Chen Ho, Tainan (TW)

(*) Notice: Subject to any disclaimer, the term of this patent is extended or adjusted under 35 U.S.C. 154(b) by 25 days.

(21) Appl. No.: 12/972,864

(22) Filed: Dec. 20, 2010

(51) Int. Cl.
*G11B 20/10* (2006.01)

(52) U.S. Cl. ............... 369/30.27; 369/47.32; 369/30.03; 369/4

(58) Field of Classification Search ............... 369/47.38, 369/31.01, 53.3, 47.11, 30.27, 47.32, 47.42, 369/53.43, 4; 381/119; 84/605, 743
See application file for complete search history.

(56) References Cited

U.S. PATENT DOCUMENTS

| | | | |
|---|---|---|---|
| 6,541,690 B1* | 4/2003 | Segers, Jr. ........................ 84/605 |
| 7,218,578 B2* | 5/2007 | Usui ........................... 369/30.27 |
| 7,257,072 B2* | 8/2007 | Kikuchi ....................... 369/53.43 |
| 7,408,854 B2* | 8/2008 | Usui et al. ................... 369/47.32 |

* cited by examiner

*Primary Examiner* — Ali Neyzari
(74) *Attorney, Agent, or Firm* — Bacon & Thomas, PLLC

(57) ABSTRACT

A turntable having multiple-point touch function for a digital sound-signal device includes a base formed with a central insert hole having a lower side provided with a load sensor, with a photo-sensor installed at one inner end of the base. A multiple-point touch-induction circuit is fixed on the base, having different sensing regions and bored with a central through hole. A touch-control turntable assembled on the circuit board has a central post protruding downward to be inserted through both the through hole and the insert hole for combining the base, the circuit board and the turntable together, the combining post having its lower end touching the load sensor. The turntable has its outer end edge provided with lots of light-obstructing plates protruding downward for obstructing light with the photo-sensor. The touch-control turntable is preset with plural memory regions to be touched for outputting different sound effects.

8 Claims, 5 Drawing Sheets

TURNTABLE HAVING MULTIPLE-POINT TOUCH FUNCTION FOR A DIGITAL SOUND-SIGNAL DEVICE

BACKGROUND OF THE INVENTION

1. Field of the Invention

This invention relates to a turntable having multiple-point touch function for a digital sound-signal device, particularly to one having a touch-control turntable divided into a plurality of memory regions. When a user's hand touches different locations on the touch-control turntable, the digital sound-signal device can output different sound signals or make sound effects of SCRATCH, and when the user slides the touch-control turntable upward and downward or leftward and rightward, action of skipping and picking out songs can be done. Further, the speed of sound signal broadcasting can be lowered or retrieved by the magnitude of force that a user touches the turntable.

2. Description of the Prior Art

Generally, on a sound-signal specialized occasion, a DJ likes to output different sound effects by scratching a record on a traditional record tray. (For instance, a DJ can quickly and precisely control a record to rotate clockwise or counter-clockwise to make sound effects with hands at a specified region of the record. At present, a CD player is operated to read a CD by laser light and the CD is only rotated clockwise perpetually at fixed lines and speeds in the course of broadcasting, thus impossible to create different sound effects; therefore, a DJ sill likes to perform by means of traditional record tray. However, one traditional record can be cut thereon with only a few songs so a DJ has to carry a large box of records with him in order to carry out performance, taking a lot of exertion and causing much inconvenience. When a DJ scratches a record, the record tray is rotated constantly, and a record pad made of felt is provided between the record and the record tray for separating them; therefore, when the record is pressed by hand, the record will stop rotating but the record tray will continue to rotate. When actuated to move forward and backward by the hand of a DJ, the record will move together with the DJ's hand in the same direction, but when the DJ's hand are released from the record, the record will immediately rotate together with the turntable in a same direction.

According to foresaid point of discussion, if a CD is to be used to simulate a traditional record tray, a turntable is necessary to be used for simulating the action of a record tray so that a DJ can operate the turntable to perform an action like scratching a record. When a DJ manually operates a turntable to rotate clockwise and counterclockwise, the rotation of the turntable can be detected by phase difference of a precise photo-sensor, and sound signals can be broadcast normally and reversely by employing a digital signal processor to control a dynamic memory. To enable a CD to function like a traditional record tray on which a record can be touched by hand to stop rotating or released to start rotating together with the record tray and broadcasting instantly, a turntable made of conducting material is employed to let a human body induce the whole plane surface of the turntable with a single-point contact mode for producing different sound signals when the turntable is touched and released. However, a turntable with a single-point contact function can produce only one sound signal and further, when the turntable is touched by hand, music will be immediately stopped broadcasting, unable to simulate a traditional record tray because there is a record pad positioned between the record and the record tray; therefore, when the record tray is rotated and the record is slightly touched, a frictional force between the record and the record pad will be produced to lower the rotating speed of the record but not completely stop the record. Substantially, there must be lots of different sound-signal points on a record so that a variety of sound effects can be made when a DJ scratches the record. The conventional turntable with single-point contact mentioned above cannot store multiple sound signals, nor can it decide to lower or retrieve sound-signal broadcasting speeds by manual force imposed on the turntable.

SUMMARY OF THE INVENTION

The objective of this invention is to offer a turntable having multiple-point touch-function for a digital sound-signal device, able to output different sound signals when different locations of a touch-control turntable are touched, and sound broadcasting speed able to be lowered or retrieved by the manual force imposed on the turntable.

The touch-control turntable in the present invention includes a base bored in the center with an insert hole having its lower side provided with a load sensor able to control sound-signal broadcasting speeds, with a photo-sensor installed at an inner end of the base. A multiple-point touch-induction circuit board is fixed on the base, divided into different sensing regions and bored in the center with a through hole corresponding with the insert hole of the base. A touch-control turntable assembled on the circuit board is provided with a central combining post protruding downward to be inserted through the through hole of the circuit board and into the insert hole of the base for combining the base, the circuit board and the turntable together, and the combining post has its lower end touching the load sensor. The touch-control turntable has its outer end edge disposed with lots of light-obstructing plates protruding downward to be rotated together with the touch-control turntable for carrying out light-obstructing action with the photo-sensor. By plural memory regions preset on the touch-control turntable, a user can touch different locations on the touch-control turntable to output different sound signals, or make sound effects of SCRATCH and perform skipping and picking out songs by sliding the turntable upward and downward or leftward and rightward, and by the magnitude of force that a user touches the turntable, the speed of sound-signal broadcasting can be lowered or retrieved.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
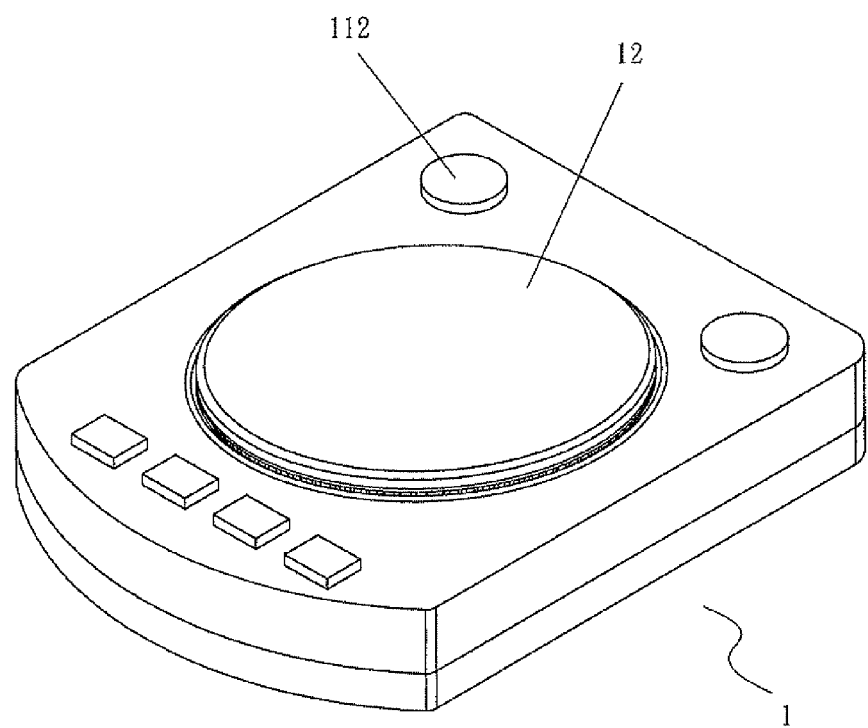
FIG. 1 is a perspective view of a turntable having multiple-point touch function for a digital sound-signal device in the present invention.
Figure 2:
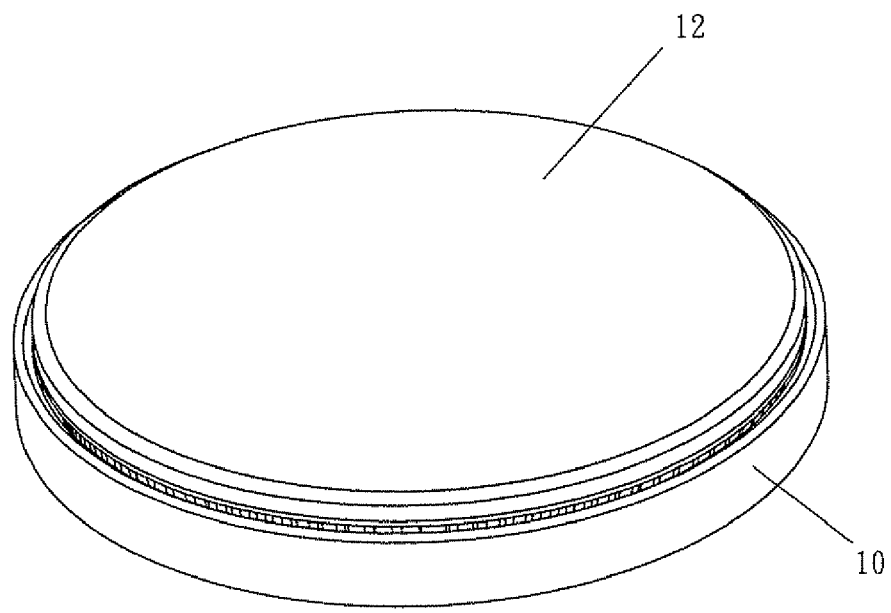
FIG. 2 is a partial perspective view of the turntable having multiple-point touch function for a digital sound-signal device in the present invention.
Figure 3:
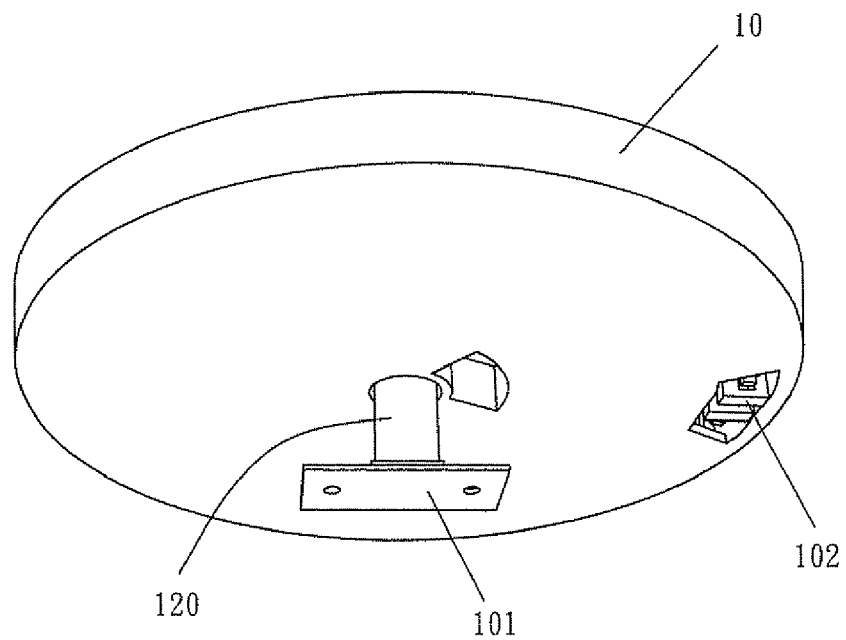
FIG. 3 is an underside perspective view of a base of the turntable having multiple-point touch function for a digital sound-signal device in the present invention.

A preferred embodiment of a turntable having multiple-point touch function for a digital sound-signal device 1, touched and controlled by a DJ, in the present invention, as shown in FIGS. 1, 2 and 3, includes a base 10, a multiple-point touch-induction circuit board 11 and a touch-control turntable 12 as main components combined together.

Figure 4:
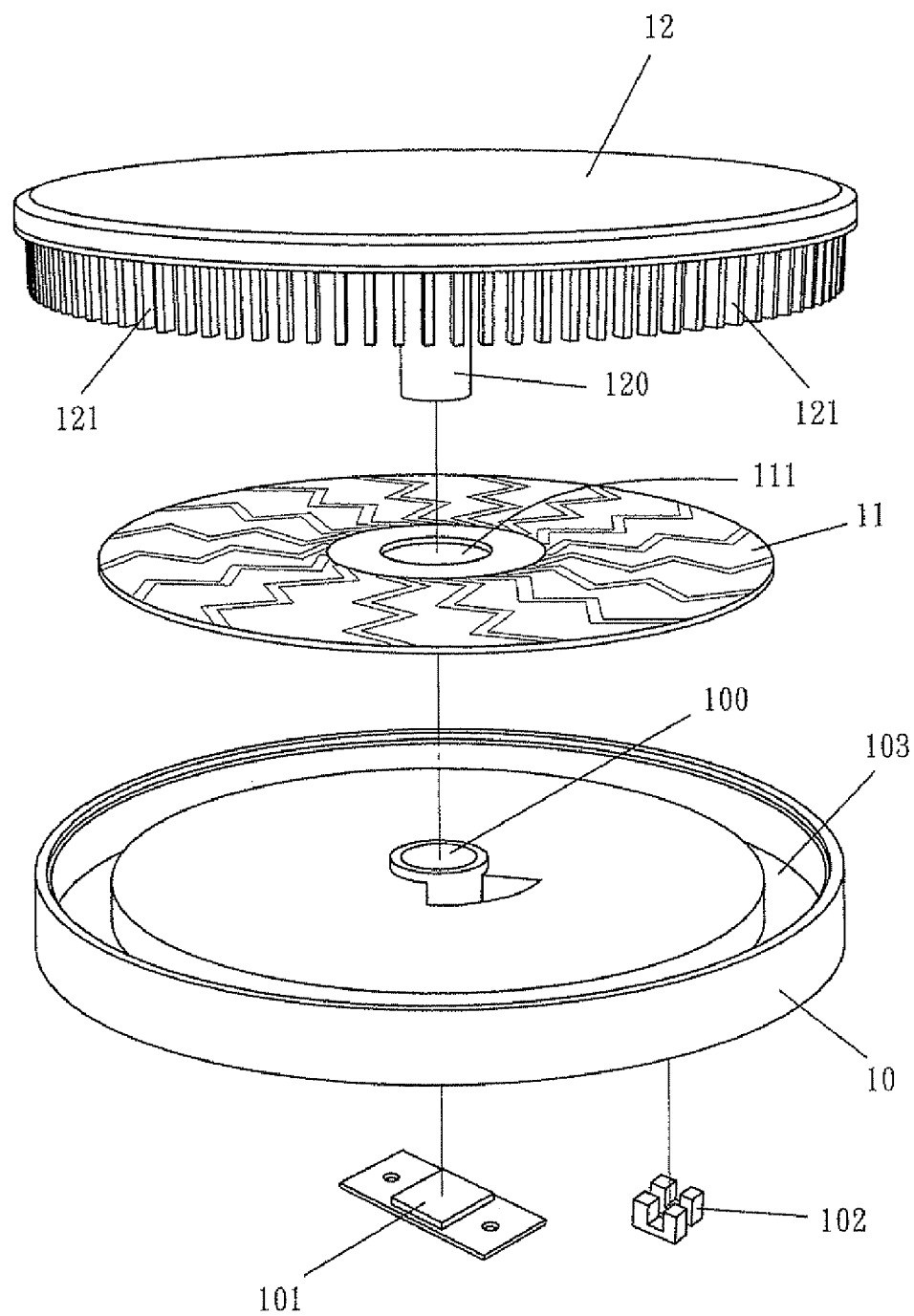
FIG. 4 is an exploded perspective view of the turntable having multiple-point touch function for a digital sound-signal device in the present invention.

The base 10 is bored with an insert hole 100 in the center and provided with a load sensor 101 under the insert hole 100 for controlling sound-signal broadcasting speeds. The base 10 further has its topside provided with a circular insert recess 103 around near an outer edge, with the insert hole 100 serving as a center of a circle, and a photo-sensor 102 fixed in the interior of the recess 103, as shown in FIGS. 3 and 4.

The multiple-point touch-induction circuit board 11 having multiple-point detecting function is fixedly stuck on the topside of the base 10. When a person's finger approaches a contact point that is to be induced by the circuit board 11, the micro-processor 11B of the digital sound-signal device will receive a touched signal of that point and correspondingly output a sound signal. The circuit board 11 has its center bored with a through hole 111 corresponding with the insert hole 100 of the base 10, and the digital sound-signal device 1 is provided with a memory key 112.

Figure 5:
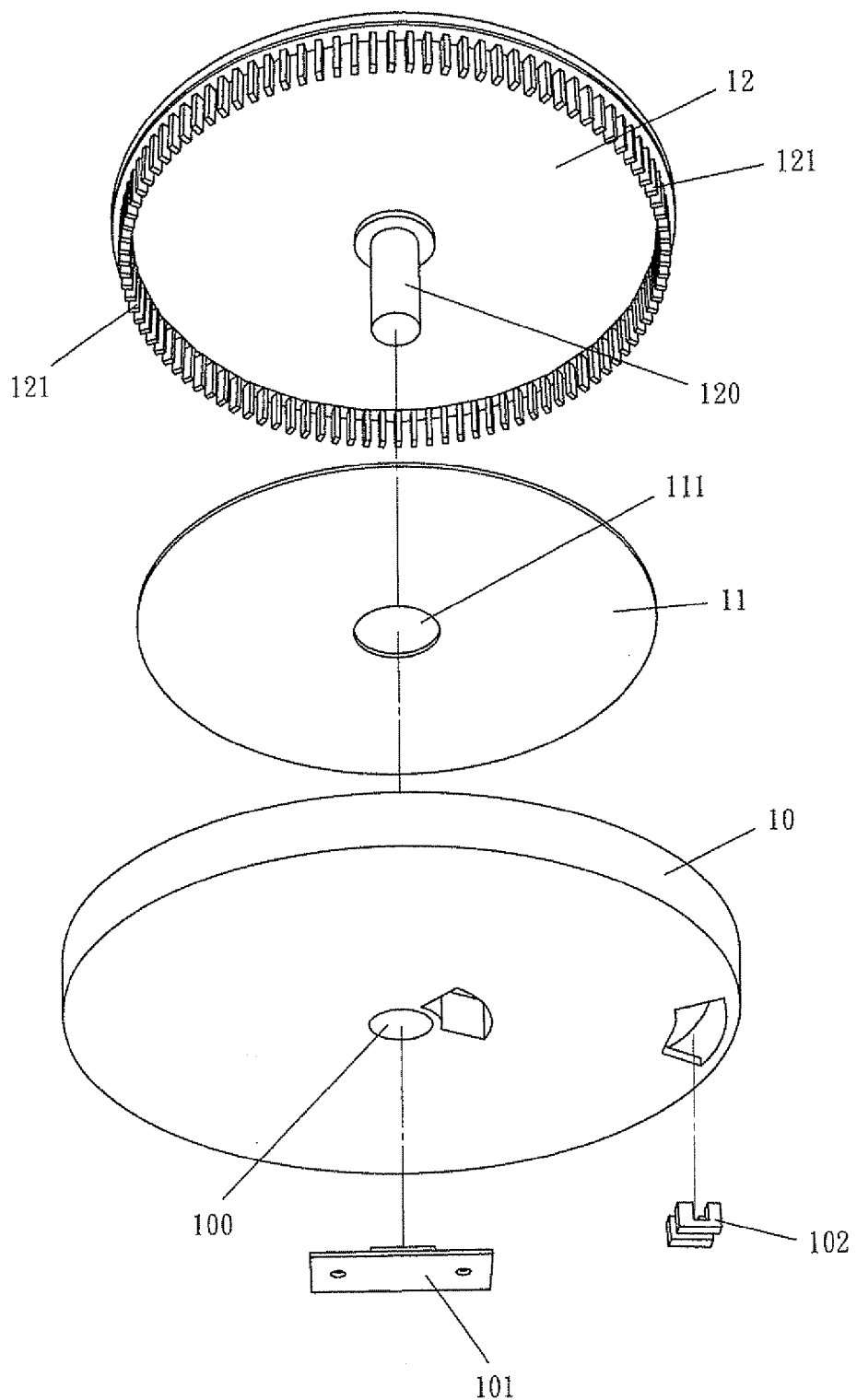
FIG. 5 is an exploded perspective underside view of the turntable having multiple-point touch function for a digital sound-signal device in the present invention.

The touch-control turntable 12 made of non-conducting material is positioned on the circuit board 11, having its central underside fixed with a combining post 120 protruding downward to be orderly inserted through the through hole 111 of the circuit board 11 and the insert hole 100 of the base 10 for combining the base 1, the circuit board 11 and the touch-control turntable 12 together, and the combining post 120 has its lower end touching the load sensor 101. The touch-control turntable 12 has the outer edge of its underside disposed with numerous light-obstructing plates 121 protruding downward, spaced apart and arranged axially to be inserted in the insert recess 103 of the base 10. When the light-obstructing plates 121 are rotated together with the touch-control turntable 12, the photo-sensor 102 can detect the rotating direction and the shifting distance of the touch-control turntable 12 by means of the light-obstructing plates 121, as shown in FIG. 5.

Figure 6:
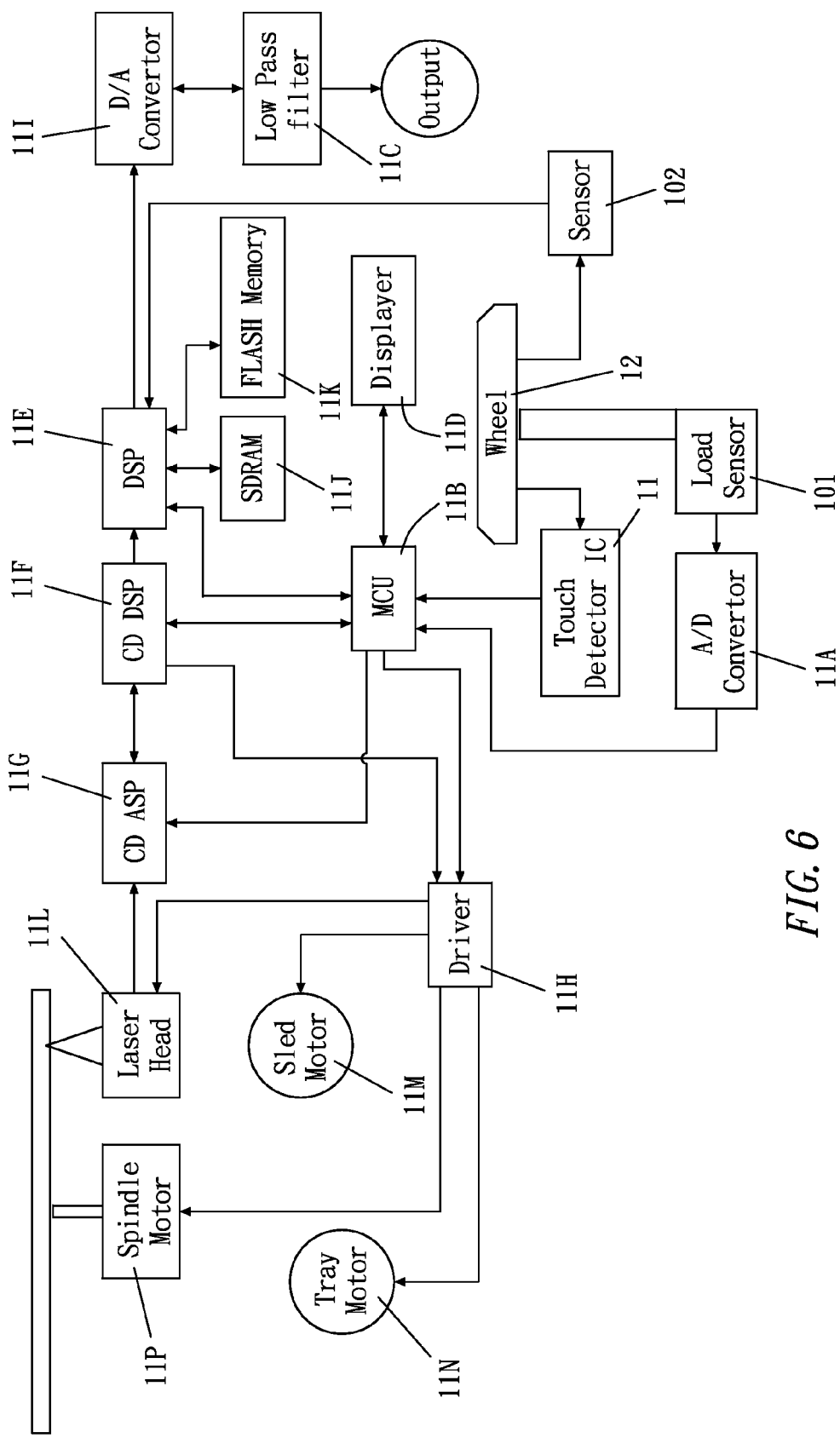
FIG. 6 is a block diagram of the structure of the turntable having multiple-point touch function for a digital sound-signal device in the present invention.

Referring to FIG. 6, the load sensor 101 of the base is connected with an analog/digital converter 11A that is connected with a micro-processor 11B. The micro-processor 11B is respectively connected with the multiple-point touch-induction circuit board 11, a displayer 11D, a digital sound-signal processor 11E, a CD digital sound-signal processor 11F, an analog signal processor 11G and a driver 11H. The photo-sensor 102 is connected with the digital sound-signal processor 11E, that is connected with a digital/analog converter 11I, a DRAM 11J and a flash memory 11K. The digital/analog converter 11I is connected with a low pass filter 11C, while the CD digital sound-signal processor 11F is connected with the digital sound-signal processor 11E, the analog signal processor 11G and the driver 11H. The analog signal processor 11G is connected with a laser head 11L, a CD spindle motor HP and a tray motor 11N FIG. 6 shows the action that the digital sound-signal device 1 has digital sound signals of a CD read and stored in dynamic memory chip, described as follows:

1. The driver 11H is controlled by the micro-processor 11B to load a CD through the tray motor 11N;

2. The micro-processor 11B controls the analog signal processor 11G to turn on the laser light and then controls the CD digital signal processor 11F and the driver 11H to start the laser head 11L to send signals to the CD digital signal processor 11F via the analog signal processor 11G. Simultaneously, the CD digital processor 11F will notify the micro-processor 11B whether it is successful in focusing;

3. In case of failure in focusing, the operation will be stopped. If successful in focusing, the micro-processor 11B will control the CD digital signal processor 11F and the driver 11H to start the CD spindle motor 11P to drive the CD to rotate at double speed;

4. During rotating of the CD, the laser head 11L reads data and then sends information to the micro-processor 11B and the digital sound-signal processor 11E through the analog signal processor 11G and the CD digital signal processor 11F. In the meantime, the micro-processor 11B has the information of the CD shown on the displayer 11D and at this time, a user can input action required to the micro-processor 11B via the displayer 11D; and 5. According to a user's action required through the displayer 11D and by inspecting and knowing the condition of the photo-sensor 102, the micro-processor 11B sends the present action status to the digital sound-signal processor 11E to have the digital data of the sound signals stored in the DRAM 11J and broadcast.

The action of the digital sound-signal processor 11E is described as follows:

1. In accordance with the condition received from the micro-processor 11B and the information of the photo-sensor 102 detected by the micro-processor 11B, the digital sound-signal processor 11E determines the disposal of the digital data of the DRAM 11J, and the speed and direction of sending out the digital data. Then, the digital data is converted into analog information through the digital/analog converter 11I and lastly, music is broadcast through the low pass filter 11C.

2. After receiving the condition of the micro-processor 11B and the information obtained by the laser head 11L, the digital sound-signal processor 11E, when necessary, will inform the micro-processor 11B to control a place from which it should read the music data required by the digital sound-signal processor 11E.

Referring to FIGS. 1-5, when a user touches the touch-control turntable 12, the circuit board 11 can detect variation of the electric capacity produced at the location where the user's hand touched the touch-control turntable 12 and thus know the location of the sensing region touched by the user. Meanwhile, the load sensor 101 will detect and judge whether the user's hand is pressed on or released from the turntable 12 and also judge the magnitude of force that the user applies to the turntable 12 so as to lower and retrieve the speed of sound-signal broadcasting. When the memory key 112 is pressed down, a user can touch any sensing region on the touch-control turntable 12 and, after a present sound-broadcasting location is memorized to a sensing region, the memory function is closed and at this time, the user can touch this sensing region at any time and immediately broadcast different sound effects and can also touch the sensing regions and set a plurality of memory points. Thus, when touching the sensing region that has been memorized, the user is able to immediately broadcast the sound signals memorized previously, and simultaneously touch the touch-control turntable 12 and control its direction to output different sound effects by means of the photo-sensor 102 that judges whether the turntable 12 is rotated clockwise or counterclockwise and the shifting distance of the turntable 12. Since the circuit board 11 is formed with a plurality of sensing regions, a user can make a song selection catalogue (or skipping and picking out songs) through sliding the touch-control turntable 12 upward and downward, or skip and pick out songs (or select from a song catalogue) though sliding the touch-control turntable 12 leftward and rightward. Moreover, sound-signal broadcasting speeds can be lowered and retrieved by the magnitude of force that a user touches the touch-control turntable 12.

As can be understood from the above description, this invention has the following advantages:

1. A plurality of memory points can be preset and thus, when touching a memorized sensing region on the turntable 12, a user can immediately broadcast sound signals that are memorized previously and can simultaneously touch and control the rotating direction to output different sound effects by means of the photo-sensor 102 that judges whether the turntable 12 is rotated clockwise or counterclockwise and also the shifting distance of the turntable 12.

2. A plurality of sensing regions formed on the circuit board 11 enables a user to make a song selection catalogue (or skipping and selecting songs) through sliding the turntable 12 upward or downward and also enable a user to skip and pick out songs (or select from a song catalogue) through sliding the turntable 12 leftward or rightward.

3. When a user's hands touch the turntable 12, the load sensor 102 can detect and judge whether the user's hand is pressed on or released from the turntable 12 and also judge the magnitude of force a user's hand imposes on the turntable 12 so as to lower or retrieve the speed of sound-signal broadcasting.

While the preferred embodiment of the invention has been described above, it will be recognized and understood that various modifications may be made therein and the appended claims are intended to cover all such modifications that may fall within the spirit and scope of the invention.

What is claimed is:

1. A turntable having multiple-point touch function for a digital sound-signal device comprising:
   a base formed with an insert hole in a center, said insert hole of said base having a lower side provided with a load sensor for controlling sound-signal broadcasting speeds, said base provided with a photo-sensor at an outer edge;
   a multiple-point touch-induction circuit board having multiple-point induction function fixed on said base, said circuit board bored in a center with a through hole corresponding with said insert hole of said base; and
   a touch-control turntable assembled on said circuit board, said touch-control turntable provided in a center with a combining post protruding downward to be inserted through both said through hole of said circuit board and said insert hole of said base for combining said base, said circuit board and said turntable together, said combination post having a lower end touched with said load sensor, said touch-control turntable having an outer end edge disposed with lots of light-obstructing plates protruding downward and arranged axially, said photo-sensor able to detect a rotating direction and shifting distance of said touch-control turntable by means of said light-obstructing plates when said light-obstructing plates are rotated together with said touch-control turntable.

2. A turntable having multiple-point touch function for a digital sound-signal device as claimed in claim 1, wherein said touch-control turntable is separated into four large regions for storing/broadcasting sound signals or making special sound effects, and said digital sound-signal device is provided with a memory key.

3. A turntable having multiple-point touch function for digital sound-signal device as claimed in claim 1, wherein said touch-control turntable is made of non-conducting material.

4. A turntable having multiple-point touch function for a digital sound-signal device as claimed in claim 2, wherein said region of said touch-control turntable can be actuated to slide upward and downward or leftward and rightward for skipping and picking out songs or selecting from a song catalogue.

5. A turntable having multiple-point touch function for a digital sound-signal device as claimed in claim 1, wherein music broadcasting speeds can be lowered and retrieved by a magnitude of force that a user's hand touches said touch-control turntable.

6. A turntable having multiple-point touch function for a digital sound-signal device as claimed in claim 2, wherein music broadcasting speeds can be lowered and retrieved by a magnitude of force that a user's hand touches said touch-control turntable.

7. A turntable having multiple-point touch function for a digital sound-signal device as claimed in claim 3, wherein music broadcasting speeds can be lowered and retrieved by a magnitude of force that a user's hand touches said touch-control turntable.

8. A turntable having multiple-point touch function for a digital sound-signal device as claimed in claim 4, wherein music broadcasting speeds can be lowered and retrieved by a magnitude of force that a user's hand touches said touch-control turntable.

* * * * *